UNITED STATES PATENT OFFICE.

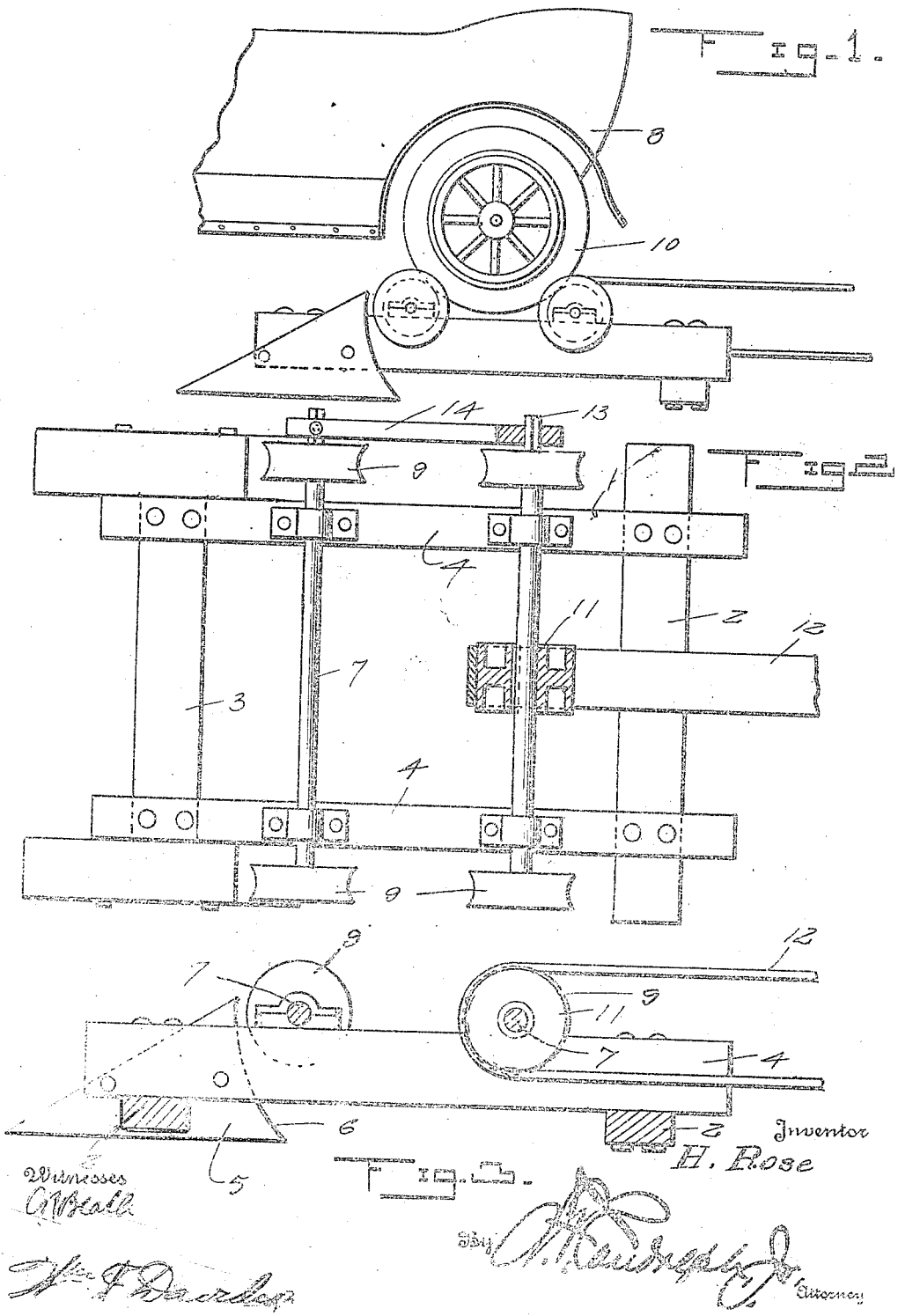

HARM ROSE, OF ROSEMONT, NEBRASKA.

AUTOMOBILE POWER-TRANSMITTING DEVICE.

1,282,952.

Specification of Letters Patent.  Patented Oct. 29, 1918.

Application filed April 4, 1918. Serial No. 226,683.

*To all whom it may concern:*

Be it known that I, HARM ROSE, a citizen of the United States, residing at Rosemont, in the county of Webster and State of Nebraska, have invented certain new and useful Improvements in Automobile Power-Transmitting Devices; and I do hereby declare the following to be a full, clear, and exact description of the invention, such as will enable others skilled in the art to which it appertains to make and use the same.

This invention relates to improvements in automobile power transmitting devices and has for one of its objects the provision of a device of this character, whereby the rear wheels of an automobile may be elevated for the purpose of deriving driving power therefrom for operating machinery and the like.

Another object of this invention is the provision of a pair of spaced shafts rotatably supported a sufficient distance apart and having means thereon for engagement with the rear wheels of an automobile for the purpose of supporting them in an elevated position and whereby the rear wheels will drive the shaft so that power may be obtained from the shafts to drive machinery and the like.

Another object of this invention is the provision of a structure for supporting the shafts having means at one end to form an inclined runway for the automobile so that the same can be readily driven by its own power onto the means carried by the shaft for supporting the rear wheels in an elevated position and which derives the driving power therefrom.

A further object of this invention is the provision of means whereby the shafts may be held against rotation when the automobile is being driven upon the device or removed therefrom.

A still further object of this invention is the provision of an automobile transmitting device of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description, and accompanying drawing, in which:—

Figure 1 is a side elevation of an automobile power transmitting device constructed in accordance with my invention, Fig. 2 is a plan view partly in section of the same, and Fig. 3 is a longitudinal sectional view illustrating the inclined runway through the frame.

Referring in detail to the drawing, the numeral 1 indicates as an entirety a supporting frame consisting of end transverse members 2 and 3, which are connected by longitudinally extending members 4 and which are relatively spaced approximately the width of the tread of an automobile. The member 3 is of a shorter length than the member 2 so that its ends terminate flush with the outer side faces of the members 4 as clearly illustrated in the drawing. Substantially triangular shaped blocks 5 are bolted or otherwise secured to the ends of the side members 4 and upon the outer side faces thereof and which are adapted to rest upon the ground as illustrated in the drawings to coöperate with the member 3 in supporting one end of the frame 1.

The web portion of the blocks 5 are slightly concaved as illustrated at 6 so as to prevent free rotation of the shafts 7 which will be hereinafter more fully described. The apexes of the triangular shaped blocks 5 are in engagement with the ground so as to form an inclined runway whereby an automobile 8 may be driven thereon and for the purpose of elevating the same in a plane slightly above the shafts 7. Grooved pulleys 9 are secured to each end of the shafts 7 and are spaced a sufficient distance apart and arranged in pairs to receive and support the rear wheels 10 of an automobile so that upon rotation of the rear wheels 10 under the motive power of the automobile, the shafts 7 will be rotated. A suitable pulley 11 is secured to one of the shafts 7 over which a power belt 12 may travel for the purpose of driving machinery and the like from the shafts.

One of the ends of each of the shafts 7 project beyond the respective pulleys 9 and are squared as illustrated at 13 and are adapted to be inserted in rectangular openings in the bar 14 when it is desired to hold the shafts 7 against rotation. This being desired when the automobile is being driven onto the grooved pulleys 9 or is being removed therefrom. By locking the shafts 7 against rotation, the rear wheels 10 of the automobile 8 may obtain a traction upon the pulleys when rotated so that the same can either be removed or replaced upon the pulleys.

While I have shown and described the preferred embodiment of my invention, it will be understood that minor changes in construction, combination, and arrangement of parts may be made without departing from the spirit and scope of the invention, as claimed.

What I claim as new is:—

A device of the character set forth comprising a frame, shafts journaled to said frame and having one of their ends squared pulleys secured to said shafts for supporting the rear wheels of an automobile, means whereby machinery or the like may be driven by one of the shafts, and a bar having rectangular openings adapted to receive the squared ends of the shafts to hold said shafts against rotation when removing or replacing the automobile upon the grooved pulleys.

In testimony whereof I affix my signature in presence of two witnesses.

HARM ROSE.

Witnesses:
   SAMUEL WHITESEL,
   O. J. BOOS.